Dec. 21, 1937.  M. J. BROWN  2,102,673
GASKET
Filed Sept. 23, 1936
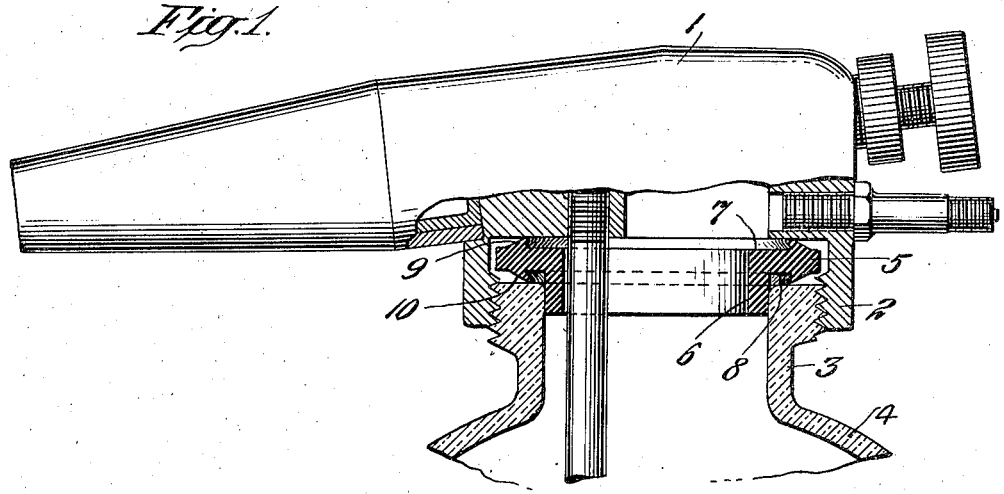
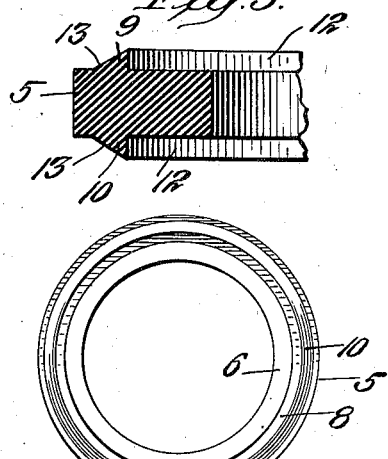
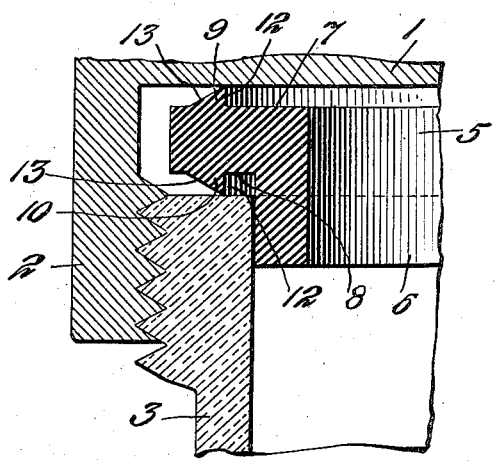
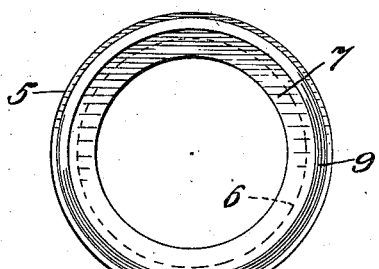
INVENTOR
MORTIMER J. BROWN
BY Sager & Malcolm
ATTORNEY Patented Dec. 21, 1937

2,102,673

UNITED STATES PATENT OFFICE 2,102,673

GASKET

Mortimer J. Brown, Niagara Falls, N. Y.

Application September 23, 1936, Serial No. 102,063

3 Claims. (Cl. 288—1)

This invention relates to gaskets of the type employed for sealing siphon bottles and other pressure vessels as well as for a variety of other purposes.

The object of the invention is to provide a simple inexpensive gasket which will afford an effective seal without excessive compression and is so constructed that the pressure of fluid within the sealed body will automatically increase the sealing effect of the gasket.

A simple illustration of a gasket embodying my invention is one which I use for sealing screw-top siphon bottles, of the type disclosed in my Patent #2,055,466 of September 29, 1936. These bottles may be used by housewives and other consumers who make their own carbonated beverages and I find it impractical to use an ordinary flat faced gasket to seal the juncture of such a bottle with its siphon head because it is impossible to compress a flat gasket sufficiently to make it gas tight without a very difficult twist of the wrist. My improved gasket, however, is so constructed that it is absolutely tight when only slightly compressed and such pressure may easily be applied by women and children who have little strength in the wrist.

In its preferred form my gasket comprises a body of deformable, relatively soft elastic material such as rubber having a continuous fin of wedge shaped cross-section on each side with the apexes of the wedges protruding so as to engage the surfaces to be sealed, these surfaces, in the case of a screw-top siphon bottle, being the contiguous flat surfaces of the siphon head and bottle. An important feature of the invention resides in forming the fins of the gasket in such a way that they will bend or dub over toward the inner annulus of the gasket when compressed, and I preferably accomplish this by making the inner faces of the fins substantially perpendicular to the plane of the gasket and the outer faces inclined with respect to such plane.

Viewing my gasket as it appears when seated on the neck of a siphon bottle, the inner faces of the wedge shaped fins will be substantially parallel to the axis of the bottle and siphon head, while the outer faces of these fins will be inclined at an angle to such axis. Now, when the siphon head is screwed down on the bottle, the pressure on the wedge shaped fins will be exerted first against the pointed apexes and then progressively against the inclined outer faces of the fins with the result that the fins will be bent over toward the interior of the bottle. Even a very slight pressure on the gasket is sufficient to bend the fins into tight sealing contact with the surfaces to be sealed, and, since the fins bend toward the interior or axis of the gasket and bottle, the pressure of the carbonated liquid or other compressed fluid in the bottle will always tend to force the fins against the contiguous surfaces of the siphon head and bottle, thereby increasing the tightness of the seal.

These and other features and advantages of the invention, including various modifications of the specific structures referred to above for purposes of illustration, will be described in connection with the accompanying drawing, in which:

Fig. 1 is a longitudinal section through a siphon bottle and head employing a gasket constructed in accordance with the invention;

Fig. 2 is an enlarged fragmentary view showing the shape of the gasket before being compressed between the bottle and head;

Fig. 3 is a plan view of the gasket as viewed from the bottom of Figs. 1 and 2;

Fig. 4 is a plan view of the gasket as viewed from the top of Figs. 1 and 2; and Fig. 5 is a fragmentary sectional view through a gasket of slightly modified construction.

In the drawing, 1 is a siphon head or top carrying a siphon tube and having an annular portion 2 which is internally threaded so that it may be screwed on the neck 3 of a vessel or bottle 4. This siphon head is similar to that disclosed in my above-mentioned Patent #2,055,466 and is shown merely for purposes of illustration since my improved gasket may be used equally well in numerous other situations.

The gasket 5 forming the subject of the present invention comprises a body of deformable, relatively soft elastic material such as rubber, and, in the form shown in Figs. 1 to 4, has a depending annular flange 6 for the purpose of centering the gasket on the mouth of the bottle 4.

In the form illustrated, the upper and lower sides 7 and 8 of the gasket are flat, and projecting outwardly from said sides, preferably in alignment with each other, are the continuous annular fins 9 and 10 as best shown in Figs. 1 and 2. The fins 9 and 10 are of wedge-shaped cross-section and have their sharp pointed apexes projecting outwardly from the gasket so as to engage the contiguous parallel surfaces of the siphon head 1 and bottle 4.

According to a feature of the invention the wedge shaped fins 9 and 10 are formed so that they will bend toward the interior when compressed between the contiguous surfaces of the siphon head 1 and bottle 4. This is preferably accomplished by making the inner faces 12 of the wedges substantially perpendicular to the sides 7 and 8, or parallel to the axis of the siphon head 1 and bottle 4, and by inclining the outer faces 13 of said wedges toward the outer periphery of the gasket as best shown in Fig. 2.

When the gasket is compressed by the application of pressure in the direction of the axis of the siphon head 1 and bottle 4, as by screwing the head on the bottle, the annular fins 9 and 10 of the gasket are bent toward the interior of the bottle as illustrated in Fig. 1. When the fins 9 and 10 are thus compressed it will be evident that pressure from within the bottle 4, that is, the pressure of the carbonated liquid or other compressed fluid in the bottle, forces the fins against the contiguous surfaces of the siphon head and bottle and thereby increases the tightness of the seal.

An important advantage of my gasket is that it is practically self-sealing, in that if a very moderate contact is established it is tight to gas and liquids. Heretofore, with ordinary gaskets not provided with sealing fins, it has been necessary to exert a very considerable force in applying the heads to siphon bottles in order to compress the gasket sufficiently to obtain even a reasonably tight seal. My improved gasket not only insures a much tighter seal than any other gasket with which I am familiar, but it also requires so little pressure that it can easily be fastened in place by a woman or child.

In constructing my gasket I prefer to provide only two fins 9 and 10, one on each side, and I prefer to arrange these two fins as nearly opposite, that is of the same radius, as possible. It might seem that since one fin on each side of the gasket provides a highly effective seal, two concentric fins should be better, but in practice I find that this is not the case. One object of my invention is to provide a gasket which will afford a tight seal with the least possible pressure for compression; and if there is a given amount of pressure available for compression, it would be divided equally between two fins, if there were two fins on a side or between three if there were three on a side; hence it is better to provide only one fin on each side of the gasket. A still more important reason for having only one fin on each side of the gasket is that each fin acts like a self-closing valve, as explained above, and if there were two concentric fins on a side, each getting only half the pressure which would be applied to one fin, and if the first fin were to leak it would then have high pressure gas on both sides and would not act as a self-closing valve. Each fin therefore provides the most effective seal when it gets the full pressure available for compression, and has the maximum differential of gas pressure from one side of the fin to the other.

It will be evident that the depending flange 6 of my gasket, which is used for centering purposes in Figs. 1 to 4, may be omitted when desired, and in Fig. 5 I have illustrated the gasket without such centering flange. In constructing certain types of pressure vessels it may be desired to fasten one side of the gasket permanently to one of the sealing surfaces of the vessel, for example to clamp or otherwise permanently fasten the lower side 8 of the gasket 5 to the neck of the bottle 4, and in such case the gasket would require only one sealing fin which in this example would be the fin 9 on the exposed side 7 of the gasket. My invention embraces such modification and it will also be evident that various other changes may be made in the details of construction herein shown and described without departing from the scope and spirit of the invention as defined in the appended claims.

The invention claimed is:

1. A gasket comprising a readily deformable elastic body having an annular fin of wedge-shaped cross-section on each side thereof with the apexes of said wedges protruding axially from the gasket so as to constitute the sole engagement with the surfaces to be sealed, said wedge-shaped fins being in alignment with each other and having their inner faces substantially parallel to the axis of the gasket and their outer faces inclined at an angle to said axis such that said outer faces remain out of engagement with the surfaces to be sealed except at said apexes when said fins are caused to bend toward the axis of the gasket by application of normal sealing pressure to said apexes.

2. A gasket comprising a readily deformable elastic body having an annular fin of wedge-shaped cross-section on at least one side thereof with the apex of said wedge protruding axially from the gasket so as to constitute the sole engagement with the surface to be sealed, said wedge-shaped fin having its inner face substantially parallel to the axis of the gasket and its outer face inclined at an angle to said axis such that said outer face remains out of engagement with the surface to be sealed except at said apex when said fin is caused to bend toward the axis of the gasket by application of normal sealing pressure to said apex.

3. In a vessel adapted to contain fluid under pressure and having a removable top, said vessel and said top having parallel surfaces to be sealed, a gasket for sealing said surfaces, said gasket comprising a readily deformable elastic body having an annular fin of wedge-shaped cross-section on each side thereof, with the apexes of said wedges protruding axially from the gasket so as to constitute the sole engagement with said surfaces, said wedge-shaped fins being in alignment with each other and having their inner faces substantially parallel to the axis of the gasket and their outer faces inclined at an angle to said axis such that said outer faces remain out of engagement with said surfaces except at said apexes when said fins are caused to bend toward the axis of the gasket by application of normal sealing pressure to said apexes.

MORTIMER J. BROWN.